United States Patent
White

(10) Patent No.: US 9,249,571 B1
(45) Date of Patent: Feb. 2, 2016

(54) INSULATING SYSTEM

(71) Applicant: Arthur Paul White, Lakeland, FL (US)

(72) Inventor: Arthur Paul White, Lakeland, FL (US)

(*) Notice: Subject to any disclaimer, the term of this patent is extended or adjusted under 35 U.S.C. 154(b) by 0 days.

(21) Appl. No.: 14/297,564

(22) Filed: Jun. 5, 2014

Related U.S. Application Data

(63) Continuation-in-part of application No. 13/888,465, filed on May 7, 2013, now abandoned, which is a continuation-in-part of application No. 13/356,036, filed on Jan. 23, 2012, now abandoned, which is a continuation-in-part of application No. 13/135,689, filed on Jul. 13, 2011, now abandoned.

(51) Int. Cl.
*E04D 13/16* (2006.01)
*E04C 2/292* (2006.01)
*E04D 13/17* (2006.01)

(52) U.S. Cl.
CPC ............ *E04C 2/292* (2013.01); *E04D 13/1637* (2013.01); *E04D 13/1681* (2013.01); *E04D 13/178* (2013.01)

(58) Field of Classification Search
CPC ... E04C 2/292; E04C 13/178; E04C 13/1681; E04C 13/1637
USPC .......... 52/506.07, 506.06, 90.1, 309.4, 407.3, 52/407.1, 407.2, 407.5, 407.4, 406.1, 52/483.1, 98, 100; 428/137, 140, 314.4, 428/316.6
See application file for complete search history.

(56) References Cited

U.S. PATENT DOCUMENTS

| | | | |
|---|---|---|---|
| 2,299,908 A * | 10/1942 | Leash .......................... 52/406.1 |
| 2,335,220 A * | 11/1943 | Edwards ....................... 428/104 |
| 2,342,839 A * | 2/1944 | Byers ........................... 428/126 |
| 2,913,104 A * | 11/1959 | Parker ........................... 206/321 |
| 2,998,337 A * | 8/1961 | Tillotson ..................... 52/406.1 |
| 3,313,072 A * | 4/1967 | Cue .............................. 52/302.3 |
| 3,509,671 A * | 5/1970 | Akerson ........................ 52/145 |
| 3,527,004 A * | 9/1970 | Sorensen ......................... 52/98 |
| 3,729,879 A * | 5/1973 | Franklin ..................... 52/406.2 |
| 4,096,790 A * | 6/1978 | Curran .......................... 454/260 |
| 5,421,133 A * | 6/1995 | Berdan et al. ............... 52/404.1 |
| 5,508,079 A * | 4/1996 | Grant et al. .................... 428/74 |
| 6,042,911 A * | 3/2000 | Berdan, II ................... 428/36.3 |
| 6,119,424 A * | 9/2000 | Martin et al. ............... 52/407.3 |
| 6,128,884 A * | 10/2000 | Berdan et al. ............. 52/742.12 |
| 7,703,254 B2 * | 4/2010 | Alderman ................. 52/506.07 |
| 7,780,886 B2 * | 8/2010 | Lembo .......................... 264/113 |
| 7,818,922 B2 * | 10/2010 | Ellis ............................... 52/95 |
| 7,908,813 B2 * | 3/2011 | Gulbrandsen et al. ...... 52/506.09 |
| 2003/0126806 A1 * | 7/2003 | Ellis ................................. 52/95 |

(Continued)

FOREIGN PATENT DOCUMENTS

| | | | | |
|---|---|---|---|---|
| DE | 3138569 A1 * | 4/1983 | ............... E04B 1/78 |
| EP | 213039 A2 * | 3/1987 | ............. E04D 13/16 |

*Primary Examiner* — Robert Canfield
*Assistant Examiner* — Babajide Demuren

(57) ABSTRACT

A break-away panel having an upper section with a trapezoidal cross sectional configuration and an upper planar surface. A lower section has a rectangular cross sectional configuration with a lower planar surface. First and second upper side surfaces are at an angle with respect to the upper and lower surfaces. The lower section has parallel lower side surfaces. The break-away panel is fabricated of a thermally insulating material. A plurality of slits are formed in the break-away panel. The slits begin a small distance from the first upper side surface. The slits extend downwardly through the upper section from the upper surface and terminate at the lower section above the lower surface.

7 Claims, 11 Drawing Sheets

(56) References Cited

U.S. PATENT DOCUMENTS

2004/0163345 A1\* 8/2004 Alderman .................... 52/404.1
2006/0218869 A1\* 10/2006 Ellis ............................. 52/309.9
2011/0271626 A1\* 11/2011 Lewis .......................... 52/407.3

\* cited by examiner

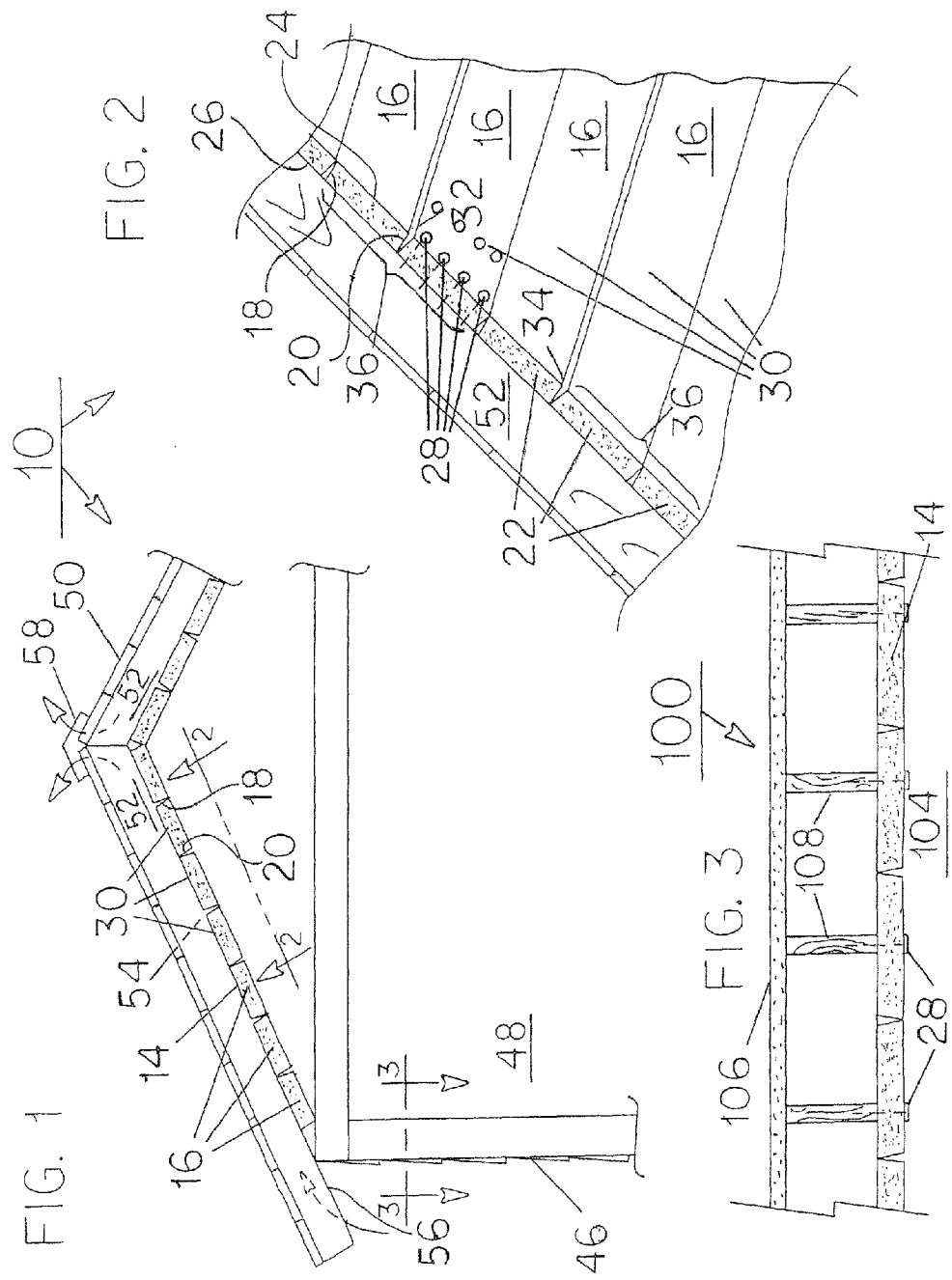

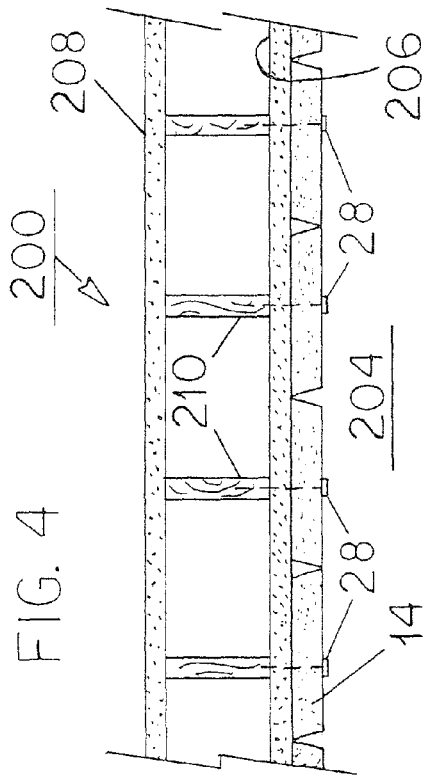
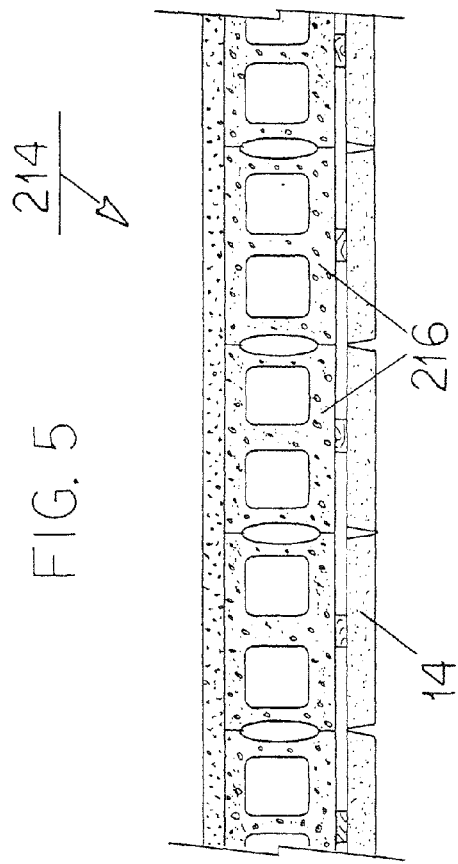

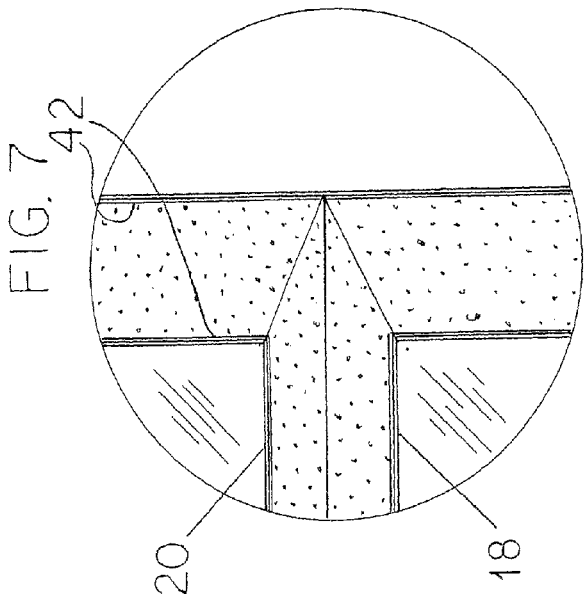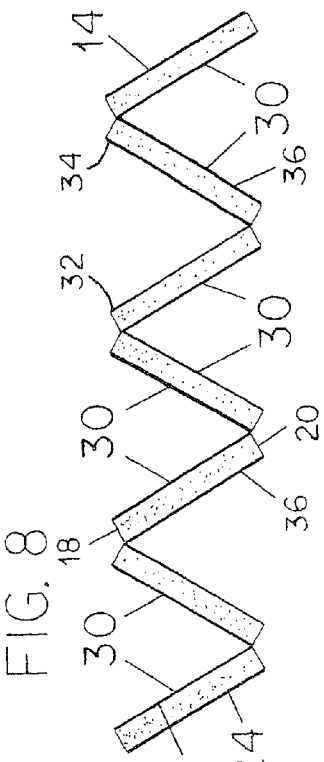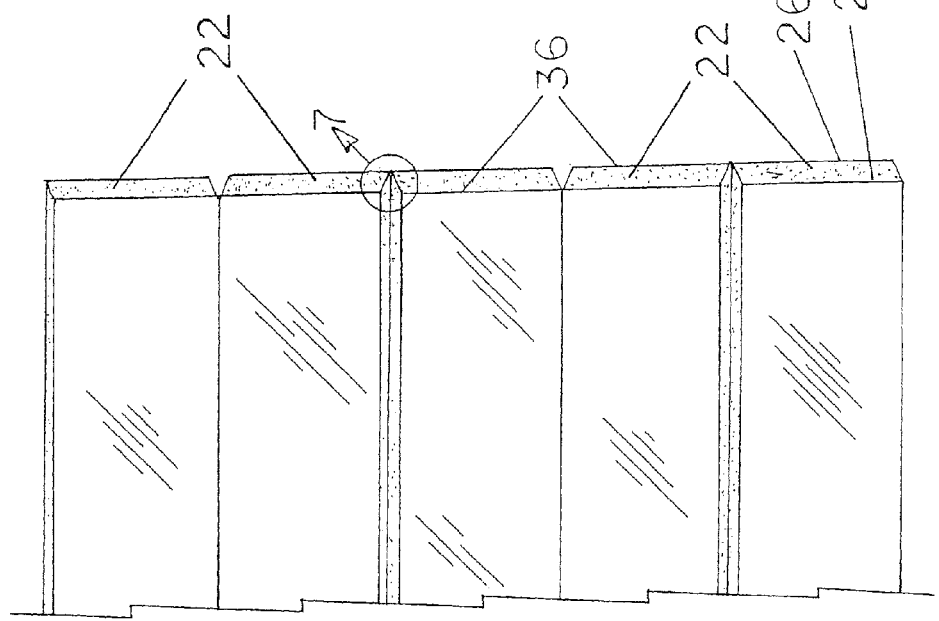

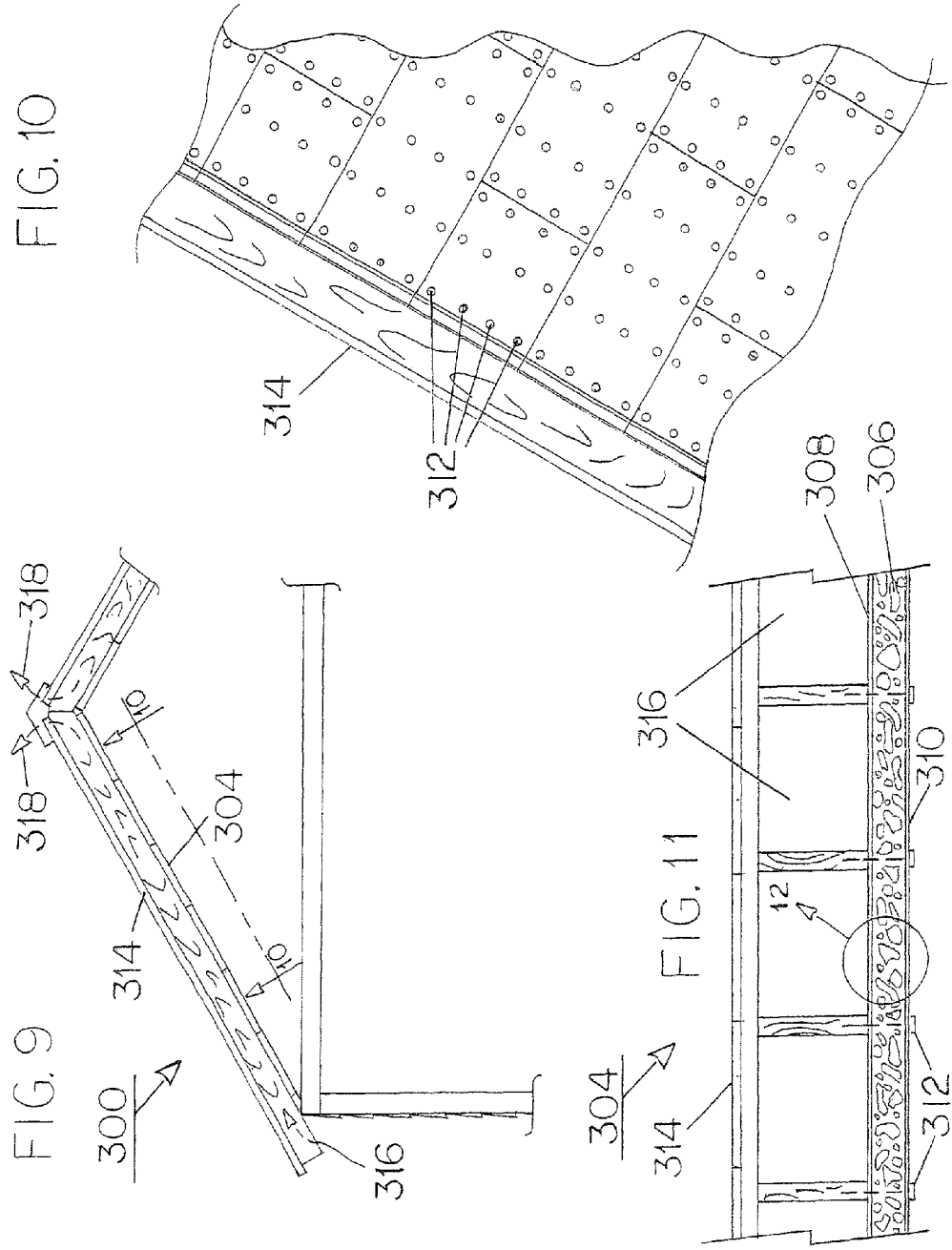

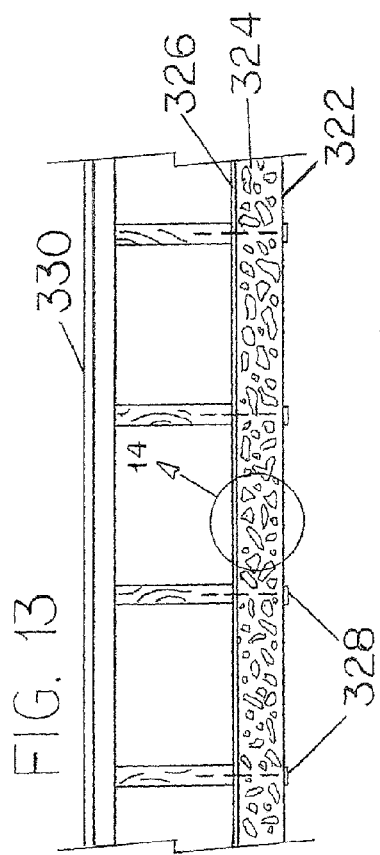
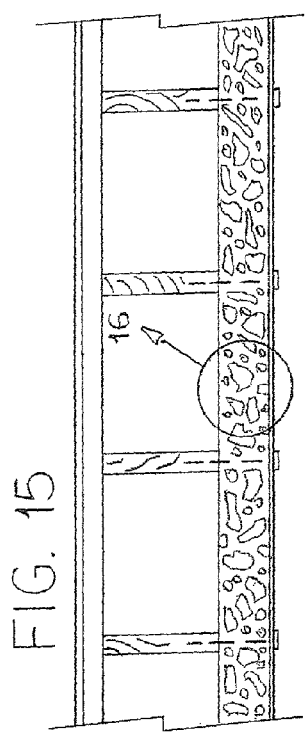
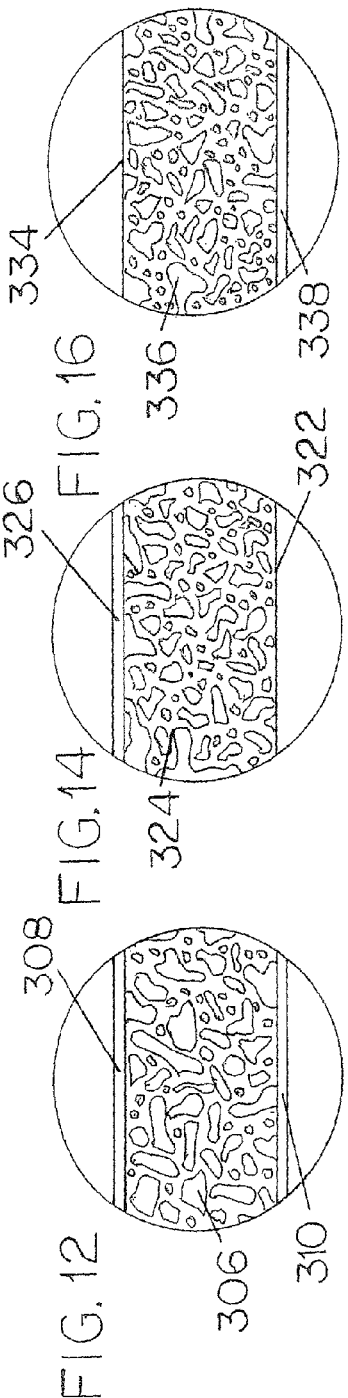

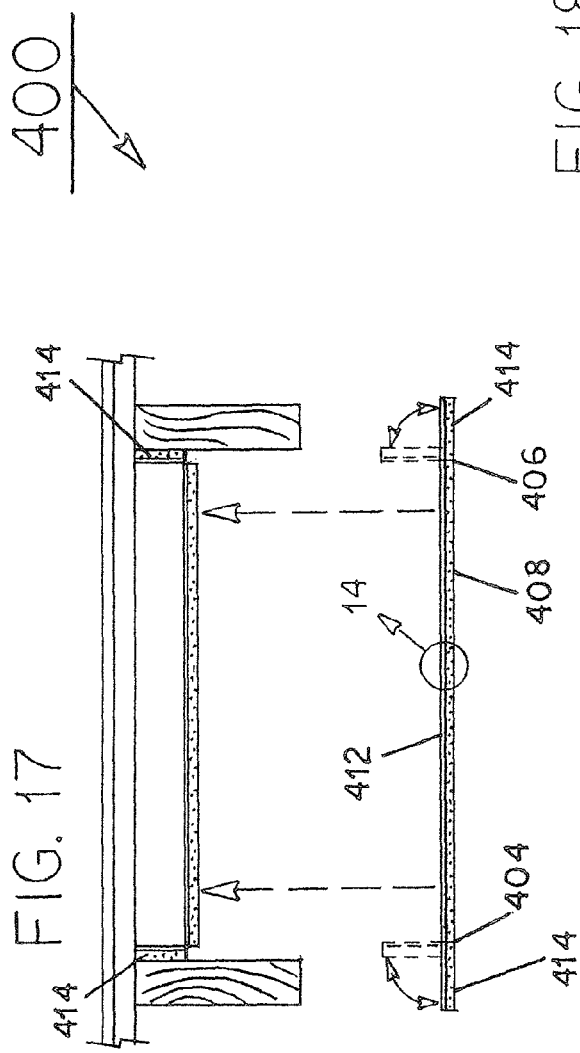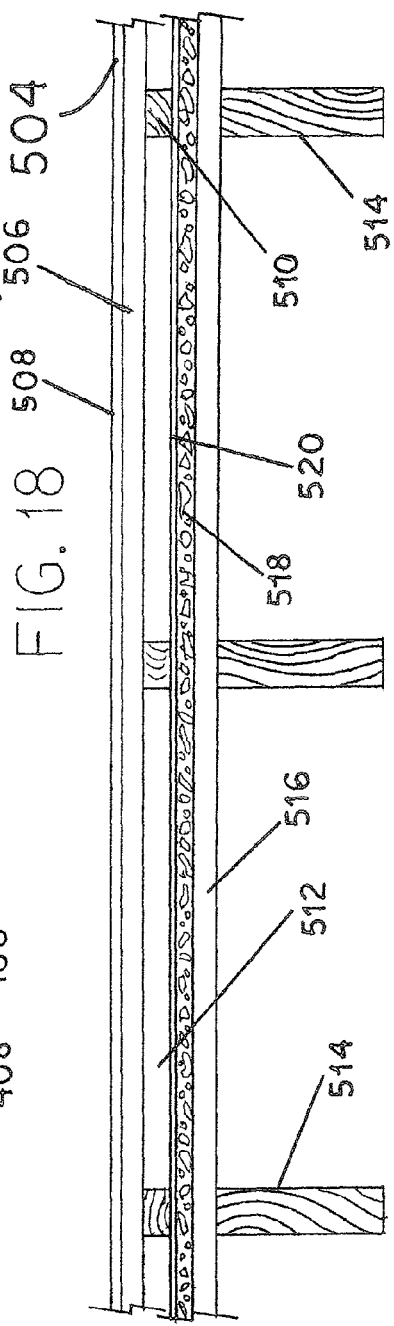

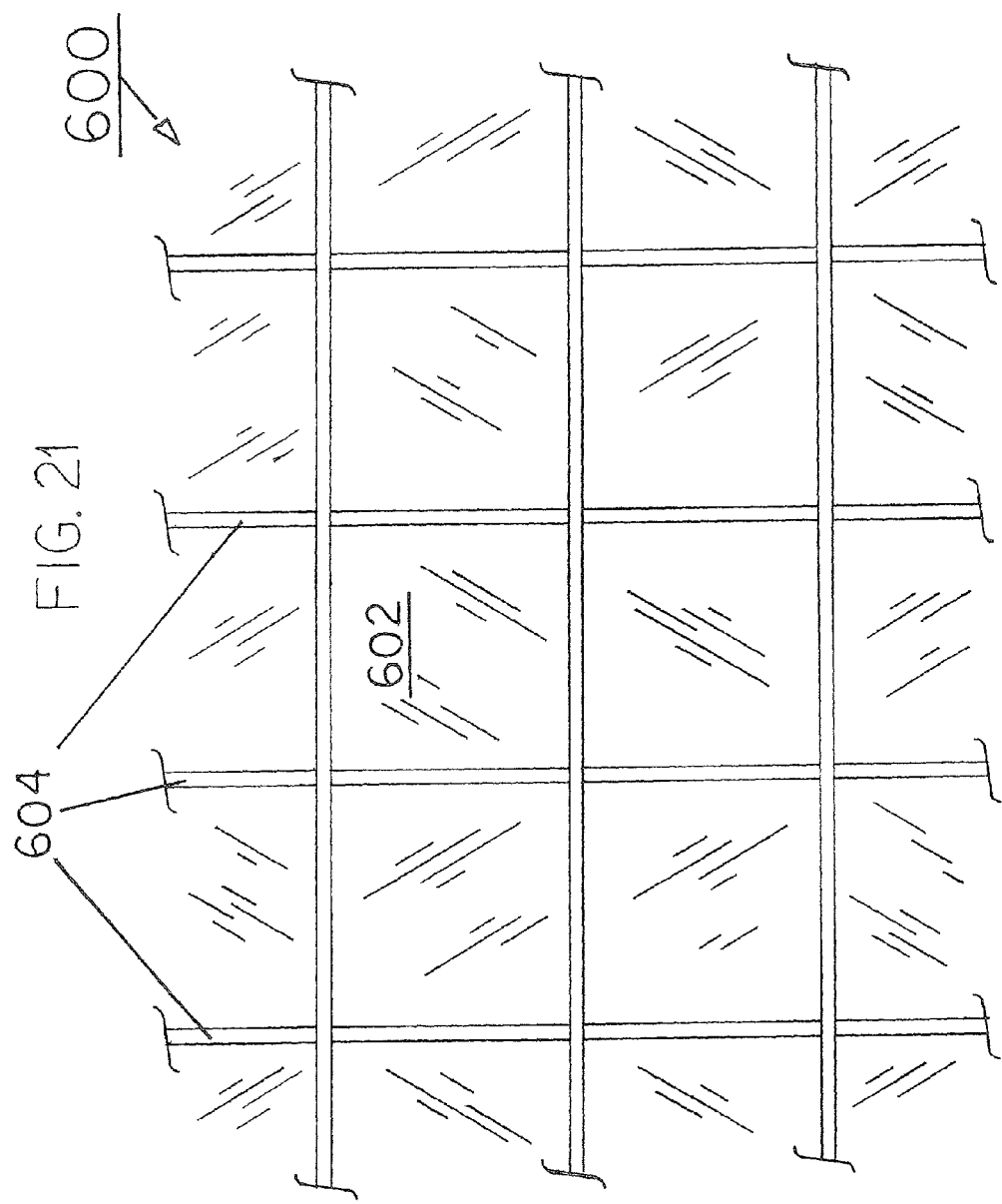

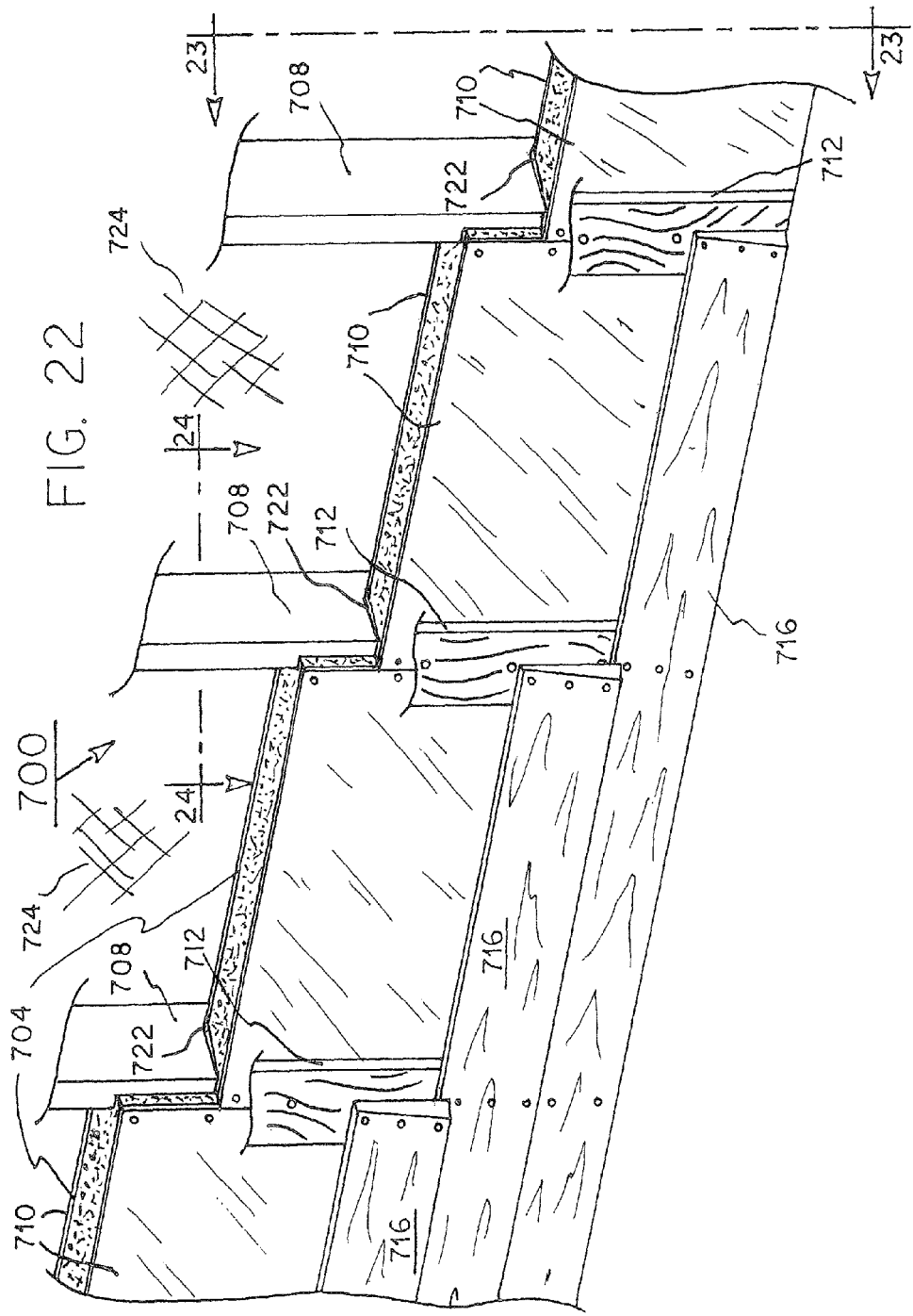

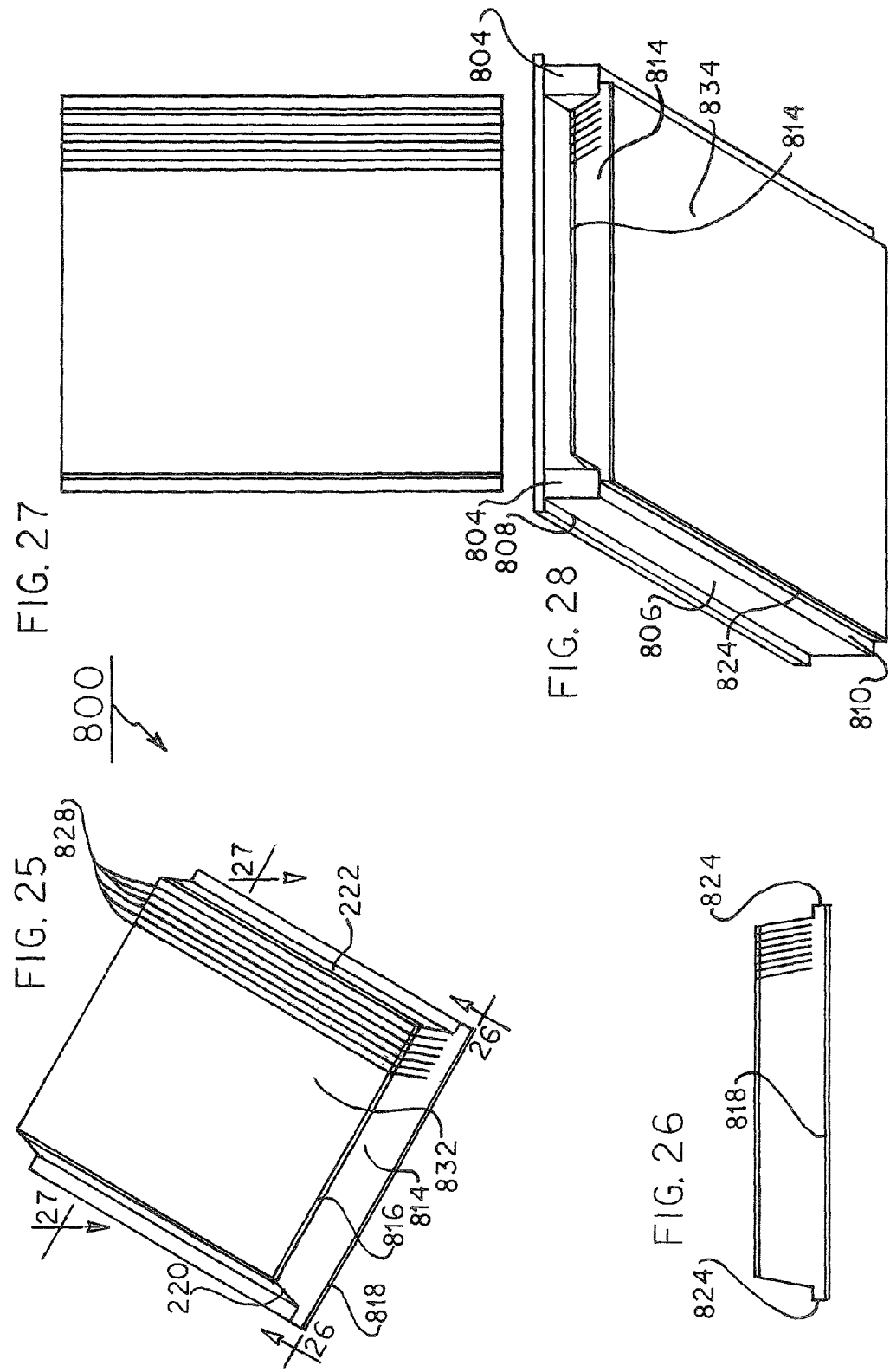

INSULATING SYSTEM

RELATED APPLICATION

The present application is a continuation-in-part of application Ser. No. 13/888,465 filed May 7, 2013 which is a continuation-in-part of application Ser. No. 13/356,036 filed Jan. 23, 2012 which, in turn, is a continuation-in-part of application Ser. No. 13/135,689 filed Jul. 13, 2011, the subject matter of which applications is incorporated herein by reference.

BACKGROUND OF THE INVENTION

Field of the Invention

The present invention relates to an insulating system and more particularly pertains to reducing the heating of a building through break-away thermally insulating panels, such reducing of heating being done is a safe, convenient and economical manner.

SUMMARY OF THE INVENTION

In view of the disadvantages inherent in the known types of insulation system now present in the prior art, the present invention provides an improved insulating system with break-away panels. As such, the general purpose of the present invention, which will be described subsequently in greater detail, is to provide a new and improved insulating system and method which has all the advantages of the prior art and none of the disadvantages.

To attain this, the present invention essentially comprises a break-away panel having an upper section with a trapezoidal cross sectional configuration and an upper planar surface. A lower section has a rectangular cross sectional configuration with a lower planar surface. First and second upper side surfaces are at an angle with respect to the upper and lower surfaces. The lower section has parallel lower side surfaces. The break-away panel is fabricated of a thermally insulating material. A plurality of slits are formed in the break-away panel. The slits begin a small distance from the first upper side surface. The slits extend downwardly through the upper section from the upper surface and terminate at the lower section above the lower surface.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved insulating system with break-away panels which has all of the advantages of the prior art insulation systems and none of the disadvantages.

It is another object of the present invention to provide a new and improved insulating system with break-away panels which may be easily and efficiently manufactured and marketed.

It is further object of the present invention to provide a new and improved insulating system with break-away panels which is of durable and reliable constructions.

An even further object of the present invention is to provide a new and improved insulating system with break-away panels which is susceptible of a low cost of manufacture with regard to both materials and labor, and which accordingly is then susceptible of low prices of sale to the consuming public, thereby making such insulating system economically available to the buying public.

Even still another object of the present invention is to provide an insulating system with break-away panels for reducing the heating of a building through radiation abatement and conduction abatement, such abatement being done is a safe, convenient and economical manner.

Lastly, it is an object of the present invention to provide a new and improved insulating system with break-away panels adapted to reduce the heating of a building through radiation and conduction abatement, such abatement being done is a safe, convenient and economical manner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred and alternate embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a cross sectional view of a portion of a building with an insulation system constructed in accordance with the principles of the present invention.

FIGS. 2 and 3 are cross sectional views taken along lnes 2-2 and 3-3 of FIG. 1.

FIGS. 4 and 5 are cross sectional views similar to FIG. 3 but illustrating alternate embodiments of the invention.

FIG. 6 is a perspective illustration of the fanfold panels of the prior Figures.

FIG. 7 is an enlarged perspective illustration taken at Circle 7 of FIG. 6.

FIG. 8 is a side elevational view of the fanfold panels, prior to installation, of the prior Figures.

FIG. 9 is a side elevational view of a building with an insulation system constructed in accordance with an alternate embodiment of the present invention.

FIG. 10 is a bottom view of a portion of the system taken along line 10-10 of FIG. 9.

FIG. 11 is a cross sectional view taken across the roof and insulation system of FIG. 9.

FIG. 12 is an enlarged showing of a portion of the insulation assembly taken at Circle 12 of FIG. 11.

FIG. 13 is a cross sectional view similar to FIG. 11 but illustrating another embodiment of the invention.

FIG. 14 is an enlarged showing of a portion of the insulation assembly taken at Circle 14 of FIG. 13.

FIG. 15 is a cross sectional view similar to FIGS. 11 and 14 but illustrating a next embodiment of the invention.

FIG. 16 is an enlarged showing of a portion of the insulation assembly taken at Circle 16 of FIG. 15.

FIG. 17 is a cross sectional view similar to FIGS. 11 and 14 but illustrating yet another embodiment of the invention with Circle 14 showing an enlarged section thereof.

FIG. 18 is a cross section of an alternate embodiment utilizing a new roof over an old roof.

FIG. 21 is a plan view of the system shown in FIGS. 19 and 20.

FIG. 22 is a perspective illustration of the final alternate embodiment of the invention featuring a wall application.

FIG. 25 is a perspective illustration of a break-away panel constructed in accordance with the primary, preferred embodiment of the invention.

FIG. 26 is a plan view of the break-away panel taken along line 26-26 of FIG. 25.

FIG. 27 is an end elevational view of the break-away panel taken along line 27-27 of FIG. 25.

FIG. 28 is a perspective view of the break-away panel shown in FIGS. 25-27.

The same reference numerals refer to the same parts throughout the various Figures.

DESCRIPTION OF THE PREFERRED EMBODIMENT

Figure 19:
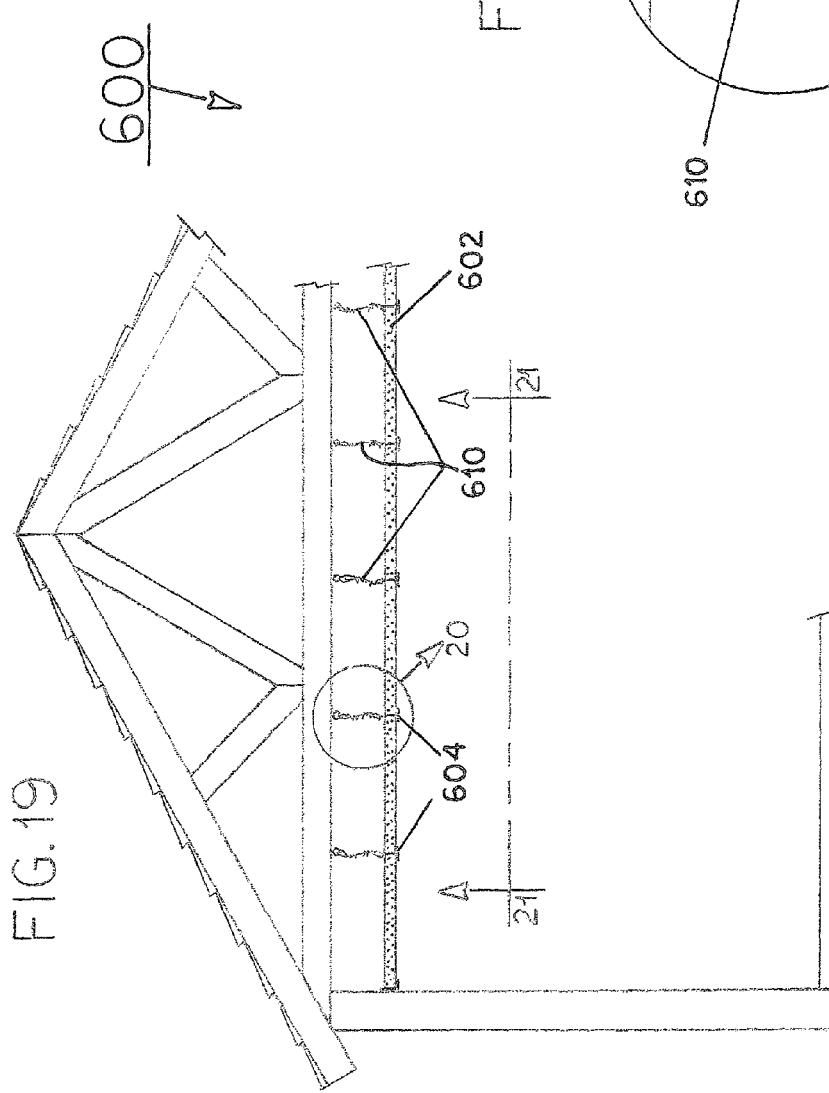
FIG. 19 is a cross sectional view similar to FIGS. 17 and 18 but illustrating yet another embodiment of the invention.

With reference now to the drawings, and in particular to FIG. 1 thereof, the preferred embodiment of the new and improved insulating system embodying the principles and concepts of the present invention and generally designated by the reference numeral 10 will be described.

The present invention, the insulating system 10 is comprised of a plurality of components. Such components in their broadest context include a plurality of thermally insulating panels, a plurality of reflective sheets, and an air space. Such components are individually configured and correlated with respect to each other so as to attain the desired objective.

First provided is an insulating assembly 14. The insulating assembly includes a plurality of generally rigid rectilinear panels 16. Each panel has a top edge 18. Each panel has a parallel bottom edge 20. The top and bottom edges are separated by a height of from 36 to 60 inches. Each panel has parallel side edges 22. The side edges are separated by a width of from 36 to 60 inches. Each panel has an interior face 24. Each panel has an exterior face 26. The interior and exterior faces are separated by a thickness of from 1 to 3 inches. Each panel is fabricated of thermally insulating foam.

The insulating assembly also includes a plurality of flexible reflective sheets 30. Each sheet has a top edge 32. Each sheet also has a parallel bottom edge 34. The top and bottom edges are separated by a height. The height is essentially equal to the height of each panel. Each sheet has parallel side edges 36. The side edges are separated by a width of essentially equal to the width of two panels. Each sheet has an intermediate extent. The intermediate extent is provided parallel with the side edges. The intermediate extent is equally spaced from the side edges. Each sheet has an interior face 38. Each sheet has an exterior face 40. The sheets are separated by a panel thickness of from 0.25 to 3.00 inches. Each sheet is fabricated of aluminized mylar.

An adhesive 42 is provided next. The adhesive couples the interior faces of the sheets to the interior and exterior faces of the panels. The panels are aligned side edge to side edge. The adhesive couples the panels in pairs. Each intermediate extent overlies each side edge of adjacent sheets. The insulating assembly is adapted to be configured in a stacked orientation during storage and transportation. The insulating assembly is adapted to be configured in a planar orientation during operation and use.

Provided last is a building 46. The building has a living zone 48. The living zone is provided below. The building has a roof 50. The roof is provided above. The building has rafters 52. The rafters support the roof. An insulating assembly is attached to the rafters on the side thereof remote from the roof. In this manner a space 54 is formed between the roof and the insulating assembly. The space has a soffit 56. The soffit is provided at a lower end. The space has a roof vent 58. The roof vent is provided at an upper end.

In this manner the thermal insulation system is adapted to reduce the heating of the living zone through radiation due to reflectivity of the reflective sheets on the exterior faces of the panels when the reflective sheets are clean and when dirty due to reflectivity of the reflective sheets on the interior surfaces.

Also in this manner the thermal insulation system is adapted to reduce the heating of the living zone through conduction abatement due to the thermal insulating properties of the panels.

Further in this manner the thermal insulation system is adapted to reduce the heating of the living zone through convection due to the flow of heated air from the soffit to the roof vent.

In alternate embodiment 100 of the system, the building has a living zone 104. The living zone is provided interiorly. The living zone has an exterior wall 106. The exterior wall is provided exteriorly. The living zone has studs 108. The studs extend interiorly from the exterior wall.

An insulating assembly 112 is provided. In this manner the insulating assembly is attached to the studs on the side thereof remote from the exterior wall. Also in this manner a space between the exterior wall and the insulating assembly. Note FIG. 4.

In another alternate embodiment 200 of the system, the building has a living zone 204. The living zone is provided interiorly. The living zone has interior and exterior walls 206, 208. The living zone has studs 210. The studs are provided between the interior and exterior walls.

In this manner the insulating assembly is attached to the interior wall on the side thereof remote from the exterior wall. In this manner a space is formed between the interior and exterior walls. Sound abatement is also facilitated. Note FIG. 4.

FIG. 5 illustrates an alternate embodiment 214 of insulation system wherein cinder blocks 216 create the space between the interior wall and the exterior wall.

As a further alternate embodiment of the invention, the embodiments of FIGS. 4 and 5 are adapted to be configured to create an air flow through the space for heat abatement through convection.

FIGS. 9-16 illustrate yet further alternate embodiments of the invention wherein the panels and the insulation assemblies are not initially coupled together. FIG. 9 shows an overall system 300 with a plurality of insulation assemblies 304. Each insulation assembly includes an insulation panel 306. Each panel has adhered thereto an interior reflective sheet 308 and an exterior reflective sheet 310. The specific materials and thicknesses of the panels and sheets are any of a wide variety as described above and as a function of the particular application. The panels and insulation assemblies are normally rectangular with a 2 by 4 foot size or a 3 by 5 foot size or any of a wide variety of other manufactured sizes or cut to fit an application as needed.

Securement of the insulation assemblies is through fasteners 312, nails or screws, for coupling to the roof 314 through intermediate studs. The studs extend from soffits below to roof vents 318 above to create an air space 316 for the natural upward flow of heated air between the insulation assemblies and the roof.

During use, the plurality of thermally insulating panels is adapted to abate the transmission of heat through conduction. In addition, the a plurality of reflective sheets coupled to the thermally insulating panels is adapted to abate the transmission of heat through radiation. Lastly, the air space in proximity to the insulating panels with means to create a flow of air through the space, whereby there is a flow of air through the air space, is adapted to abate the transmission of heat through convection.

A further alternate embodiment 330 is illustrated in FIGS. 13 and 14. In such alternate embodiment, each insulation assembly 332 includes an insulation panel 324 and an interior reflective sheet 326. An interior reflective sheet is not utilized. Each insulating panel thus has a reflective sheet 326 on the interior surface only and with no reflective sheet on the exterior surface. Fasteners 328 couple the insulation assemblies to the studs which in turn couple to the roof with an air space there between as described above. Also as described above, heating is reduced while cooling is promoted through conduction abatement, increased radiation and through convection.

A next alternate embodiment 330 is illustrated in FIGS. 15 and 16. In such final alternate embodiment, each insulation assembly 334 includes an insulation panel 336 and an exterior reflective sheet 338. An interior reflective sheet is not utilized. Each insulating panel thus has a reflective sheet 338 on the exterior surface only and with no reflective sheet on the interior surface. Fasteners couple the insulation assemblies to the studs which in turn couple to the roof with an air space there between as described above. Also as described above, heating is reduced while cooling is promoted through conduction abatement, increased radiation and through convection.

Turning now to FIG. 17, there is shown a system 400. In such system each panel has parallel slits 404, 406 extending upwardly from the exterior face 408. Each slit terminates adjacent to the interior face 410. In this manner the reflective sheet 412 on the interior face functions as a hinge and allows edge sections 414, 416 to be folded upwardly at 90 degree angles and frictionally hold each panel between rafters 418.

FIG. 18 illustrated a system 500 wherein each new roof 504 includes a new deck 506 and shingles 508. Beneath the new roof is a foam panel 518 below and a reflective surface 520 above. The foam panel is positioned upon the old roof 516. Firing strips 510 are located between the reflective sheet and the new deck to create air space 512. The new roof, foam panel and reflective surface are secured in position by trusses 514. 514.

Figure 20:
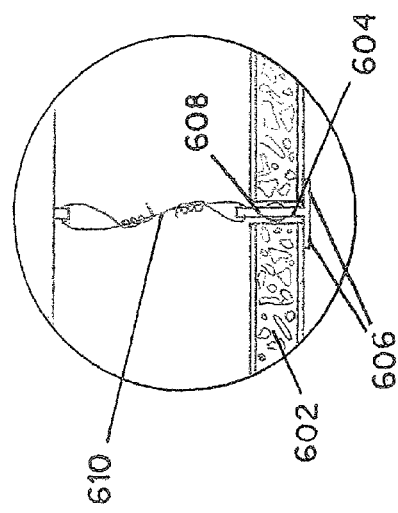
FIG. 20 is an enlarged showing of a portion of the insulation assembly taken at Circle 20 of FIG. 14.

The next system 600 includes adjacent panels having a linear support 604. The linear support is in an inverted T-shaped configuration. Each support has laterally extending sections 506 supporting adjacent panels by their exterior faces 608. Each support has a central section positionable between adjacent panels. Wires 610 couple the central sections to rafters 612 there above. Note FIGS. 19, 20 and 21.

Figure 24:
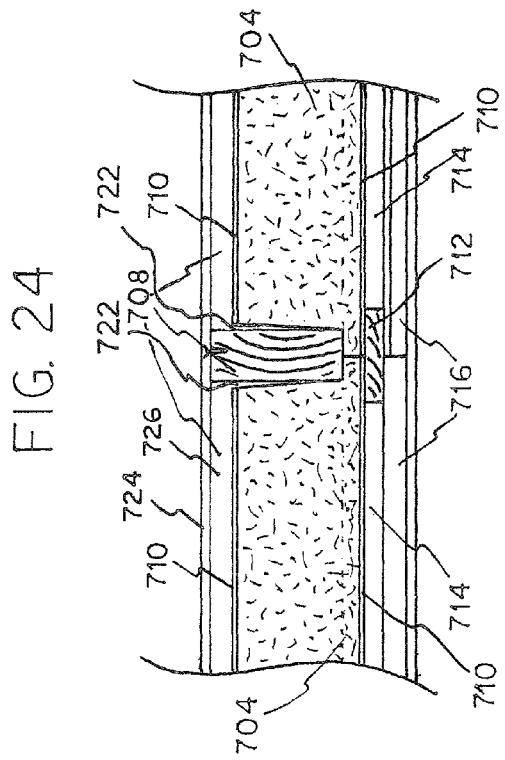
FIGS. 23 and 24 are cross sectional views taken along lines 23-23 and 24-24 of FIG. 22.
Figure 23:
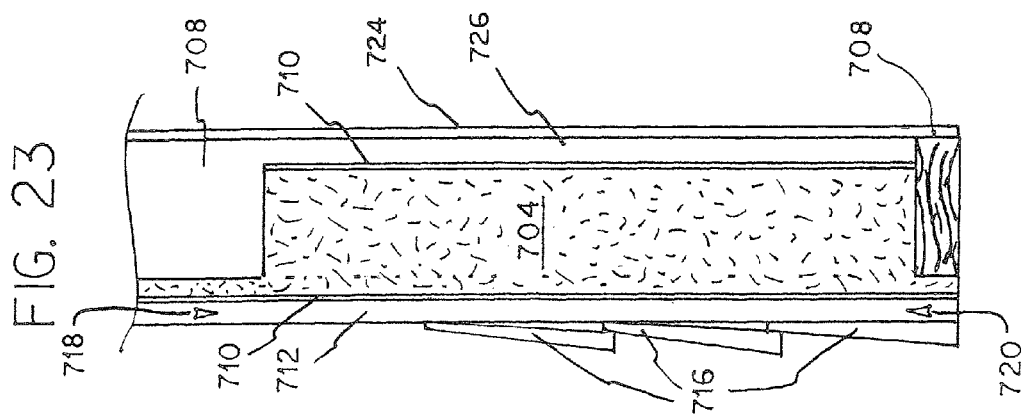

FIGS. 22, 23 and 24 illustrate the next alternate embodiment of the invention featuring a system 700 for wall applications. In such application, the thermally insulating panels 704 are vertically insulated adjacent to a wall of a building. Framing boards 708 support the thermally insulating panels. The reflective sheets 710 are secured to at least one surface of the thermally insulating panels, both surfaces in the disclosed preferred embodiment. Also included are vertically oriented nailer boards 712 laterally spaced from each other to form air spaces 714 between the insulating panels and building siding 716. The side edges of each panel are preferably trimmed to form a shallow angle 722 to facilitate positioning the panels between supporting framing boards. The air spaces have upper openings 718 above the air spaces and lower openings 720 below the spaces whereby heat generated in the air spaces will cause an air flow upwardly through the air spaces. An inner finished wall 724 creates an air space 726 between the inner finished wall and the insulating panel 704. The system of this embodiment provides insulation from heat conduction, convection and radiation. The system also constitutes a rain shield as well as an insulation and radiation barrier.

FIGS. 25 through 28 are showings of an insulating panel 800 constructed in accordance with the final and preferred alternative embodiment of the invention. In such embodiment, the invention is a green star panel 800 and a system which includes a panel and a roof formed of a plurality of panels with rafters 804 and a roof. Each rafter has parallel side faces 806 thereby forming a plurality of openings between the rafters. The side faces are spaced by essentially 2 inches. The rafters each have a vertical mid-plane equally spaced between the parallel side faces. The mid-planes are spaced by essentially 24 inches. Each rafter has an upper face 808 and a lower face 810. The upper and lower faces are spaced by essentially 4 inches.

A plurality of panels 814 are next provided. Each panel has an upper section with a trapezoidal cross sectional configuration and an upper planar surface 816. Each panel has a lower section with a rectangular cross sectional configuration with a lower planar surface 818. The major portion of each panel is located within an associated opening between adjacent rafters. Each upper section has first and second upper side surfaces 820, 822 at an angle of between 10 degrees and 20 degrees with respect to the upper and lower surfaces. Each lower section has parallel lower side surfaces 824. The lower side surfaces are spaced by essentially 24 inches. The upper side surfaces are spaced by 22 inches adjacent to the lower section. The upper side surfaces are spaced by 20 inches at the upper surface. Each panel is fabricated of a thermally insulating material selected from a class of thermally insulating materials consisting of multicellular expanded synthetic resinous material and expanded polystyrene material.

Six slits 828 are formed in each panel. The slits are spaced 1 inch from each adjacent slit. The slits begin one inch from the first upper side surface. Each of the slits extends downwardly through the upper section from the upper surface and terminates at the lower section above the lower surface. The slits are adapted to facilitate braking off of a portion of a panel to accommodate differing distances in the spacing between rafters.

Lastly provided is an upper sheet of reflective foil 832 secured to the upper surface of each panel. Also provided is a lower sheet 834 of reflective foil secured to the lower surface of each panel. The reflective foil is fabricated of a reflective material selected from the class of reflective materials consisting of aluminum and tin.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An insulation system including:
    a break-away panel having an upper section with a trapezoidal cross sectional configuration and an upper planar surface, a lower section with a rectangular cross sectional configuration with a lower planar surface, first and second upper side surfaces at an angle with respect to the upper and lower planar surface, the lower section having parallel lower side surfaces, the break-away panel being fabricated of a thermally insulating material; and
    a plurality of parallel slits formed in the break-away panel, the slits beginning a small distance from the first upper side surface, the slits extending downwardly through the upper section from the upper planar surface and terminating at the lower section above the lower surface, and wherein the first and second upper side surfaces are at an angle of between 10 degrees and 20 degrees with respect to the upper and lower planar surfaces, the lower section having parallel lower side surfaces spaced by a first distance, the upper side surfaces being spaced by a second distance less than the first distance adjacent to the lower section, the slits including a plurality of parallel slits formed in each panel, the slits being spaced a small distance several times smaller than the second distance from each adjacent slit, the slits beginning from adjacent to the first upper side surface, the slits adapted to facilitate braking off of a portion of a panel to accommodate differing distances in spacing between rafters.

2. The system as set forth in claim 1 and further including:
    an upper sheet of reflective foil secured to the upper surface of the panel, the reflective foil being fabricated of a reflective material selected from the class of reflective materials consisting of aluminum and tin.

3. The system as set forth in claim 1 and further including:
    a lower sheet of reflective foil secured to the lower surface of the panel, the reflective foil being fabricated of a reflective material selected from the class of reflective materials consisting of aluminum and tin.

4. The system as set forth in claim 1 and further including:
    an upper sheet of reflective foil secured to the upper surface of the panel, a lower sheet of reflective foil secured to the lower surface of the panel, the reflective foil being fabricated of a reflective material selected from the class of reflective materials consisting of aluminum and tin.

5. The system as set forth in claim 1 and further including a roof formed of a plurality of rafters, each rafter having parallel side faces thereby forming a plurality of openings between the rafters, the side faces being spaced by essentially 2 inches, the rafters each have a vertical mid-plane equally spaced between the parallel side faces, the mid-planes being spaced by essentially 24 inches, each rafter having an upper face and a lower face, the upper and lower faces being spaced by essentially 4 inches, the system including a plurality of panels, each panel being positioned between adjacent rafters.

6. A green star panel (800) system including:
    a roof formed of a plurality of rafters (804), each rafter having parallel side faces (806) thereby forming a plurality of openings between the rafters, the side faces being spaced by essentially 2 inches, the rafters each have a vertical mid-plane equally spaced between the parallel side faces, the mid-planes being spaced by essentially 24 inches, each rafter having an upper face (808) and a lower face (810), the upper and lower faces being spaced by essentially 4 inches;
    a plurality of panels (814), each panel having an upper section with a trapezoidal cross sectional configuration and an upper planar surface (816), each panel having a lower section with a rectangular cross sectional configuration with a lower planar surface (818), a major portion of each panel being located within an associated opening between adjacent rafters, each upper section having first and second upper side surfaces (820), (822) at an angle of between 10 degrees and 20 degrees with respect to the upper and lower planar surface, each lower section having parallel lower side surfaces (824), the lower side surfaces being spaced by essentially 24 inches, the upper side surfaces being spaced by 22 inches adjacent to the lower section, the upper side surfaces being spaced by 20 inches at the upper surface, each panel being fabricated of a thermally insulating material selected from a class of thermally insulating materials consisting of multicellular expanded synthetic resinous material and expanded polystyrene material;
    six slits (828) formed in each panel, the slits being spaced 1 inch from each adjacent slit, the slits beginning one inch from the first upper side surface, each of the slits extending downwardly through the upper section from the upper surface and terminates at the lower section above the lower surface, the slits adapted to facilitate braking off of a portion of a panel to accommodate differing distances in the spacing between rafters; and
    an upper sheet of reflective foil (832) secured to the upper surface of each panel, a lower sheet (834) of reflective foil secured to the lower surface of each panel, the reflective foil being fabricated of a reflective material selected from the class of reflective materials consisting of aluminum and tin.

7. A thermal insulation system comprising:
    a roof with a plurality of supporting rafters beneath the roof, each rafter having parallel side faces thereby forming a plurality of openings between the rafters, the side faces being spaced, the rafters each have a vertical mid-plane equally spaced between the parallel side faces, each rafter having an upper face and a lower face;
    a plurality of thermally insulating panels, each panel located between adjacent rafters, parallel air spaces bounded elevationally between the roof and the panels, the parallel air spaces bounded laterally by adjacent rafters, each panel having an upper section with a trapezoidal cross sectional configuration and an upper planar surface, each panel having a lower section with a rectangular cross sectional configuration with a lower planar surface, a major portion of each panel being located within an associated opening between adjacent rafters, each upper section having first and second upper side surfaces at an angle with respect to the upper and lower planar surface, each lower section having parallel lower side surfaces, the lower side surfaces being spaced, the upper side surfaces being spaced adjacent to the lower section, the upper side surfaces being spaced at the upper surface, each panel being fabricated of a thermally insulating material selected from a class of thermally insulating materials consisting of multicellular expanded synthetic resinous material and expanded polystyrene material;

a plurality of slits formed in each panel, the slits being spaced from each adjacent slit, the slits beginning adjacent to the first upper side surface, each of the slits extending downwardly through the upper section from the upper planar surface and terminates at the lower section above the lower planar surface, the slits adapted to facilitate braking off of a portion of a panel to accommodate differing distances in the spacing between rafters;

an upper sheet of reflective foil bonded to the upper surface of each panel, a lower sheet of reflective foil bonded to the lower surface of each panel, the reflective foil being fabricated of a reflective material selected from the class of reflective materials consisting of aluminum and tin;

a soffit forming lower openings at the air spaces, a roof vent forming upper openings at the air spaces, the soffit and roof vent creating a flow of air through the air spaces whereby the system is adapted to reduce heating through radiation due to reflectivity of the reflective sheets on the upper planar surfaces of the panels when the reflective sheets are clean and when dirty due to reflectivity of the reflective sheets on the lower planar surfaces; and whereby the system is adapted to reduce heating through conduction abatement due to the thermal insulating properties of the panels; and whereby the system is adapted to reduce heating through convection due to the flow of heated air from the soffit to the roof vent.

* * * * *